(12) United States Patent
Leveille et al.

(10) Patent No.: US 10,712,463 B2
(45) Date of Patent: *Jul. 14, 2020

(54) SEISMIC DATA ACQUISITION WITH VARYING DISTANCE BETWEEN SEISMIC VESSELS

(71) Applicant: ION Geophysical Corporation, Houston, TX (US)

(72) Inventors: Jacques Pierre Leveille, Houston, TX (US); Paul Brettwood, Sunderland (GB); Jeffrey Alan Meredith, Highlands Ranch, CO (US)

(73) Assignee: ION Geophysical Corporation, Houston, TX (US)

( * ) Notice: Subject to any disclaimer, the term of this patent is extended or adjusted under 35 U.S.C. 154(b) by 382 days.

This patent is subject to a terminal disclaimer.

(21) Appl. No.: 15/650,406

(22) Filed: Jul. 14, 2017

(65) Prior Publication Data

US 2017/0315250 A1 Nov. 2, 2017

Related U.S. Application Data

(63) Continuation of application No. 14/564,363, filed on Dec. 9, 2014, now Pat. No. 9,720,120.

(60) Provisional application No. 61/914,836, filed on Dec. 11, 2013.

(51) Int. Cl.
*G01V 1/38* (2006.01)

(52) U.S. Cl.
CPC .................. *G01V 1/3808* (2013.01)

(58) Field of Classification Search
CPC .................................... G01V 1/3808

USPC ........................................................... 367/15
See application file for complete search history.

(56) References Cited

U.S. PATENT DOCUMENTS

| | | | |
|---|---|---|---|
| 3,806,863 A | 4/1974 | Tilley et al. | |
| 9,720,120 B2 * | 8/2017 | Leveille | ............... G01V 1/3808 |
| 2007/0159921 A1 | 7/2007 | Regone et al. | |
| 2012/0002503 A1 | 1/2012 | Janiszewski et al. | |
| 2013/0028045 A1 | 1/2013 | Ferber | |
| 2013/0135966 A1 | 5/2013 | Rommel et al. | |

FOREIGN PATENT DOCUMENTS

| | | |
|---|---|---|
| GB | 1285769 | 8/1972 |
| GB | 1285769 A | 8/1972 |
| GB | 2460073 A | 11/2009 |
| WO | 2007042831 A1 | 4/2007 |

OTHER PUBLICATIONS

First Office Action dated Sep. 26, 2017 in connection with Chinese Patent Application No. 201480075327.3, 30 pages including English Translation.

(Continued)

*Primary Examiner* — Daniel L Murphy
(74) *Attorney, Agent, or Firm* — Patterson + Sheridan, LLP

(57) ABSTRACT

A method for acquiring seismic data comprises operating a seismic vessel towing at least one of a seismic streamer with a plurality of seismic sensors and a seismic source. The inline distance between the vessel and one or more other vessels is adjusted according to a predefined function, where the seismic vessels travel along offset seismic acquisition lines, by increasing and reducing the in-line distance during the acquisition of the seismic data.

20 Claims, 10 Drawing Sheets

(56) References Cited

OTHER PUBLICATIONS

International Search Report and Written Opinion dated Mar. 23, 2015 in connection with International Patent Application No. PCT/US2014/069334, 9 pages.
Office Action dated Nov. 20, 2018 in connection with Mexican Patent Application No. MX/a/2016/007583, 5 pages including English translation.
Office Action dated Jan. 15, 2019 in connection with Danish patent application No. PA 2016 70433, 4 pages.
Office action dated Jan. 11, 2019 in connection with Chinese Patent Application No. 201480075327.3, 27 pages including English translation.
Official Action dated Jun. 11, 2018 in connection with Chinese Patent Application No. 201480075327.3, 26 pages including English translation.
Official Action dated Dec. 5, 2017 in connection with Danish Patent Application No. PA 2016 70433, 11 pages.
Goold, John C. et al. "Broadband spectra of seismic survey air-gun emissions, with reference to dolphin auditory thresholds." The Journal of the Acoustical Society of America 103, 2177 (1998), 9 pages.
Fourth technical examination report dated Jul. 5, 2019 in connection with Danish Patent Application PA201670433, 3 pages.
Fifth technical examination report dated Feb. 26, 2020 in connection with Danish patent application No. PA201670433, 4 pages.
Examination Report dated Feb. 5, 2020 in connection with United Kingdom patent application No. 1611737.6, 6 pages.

\* cited by examiner

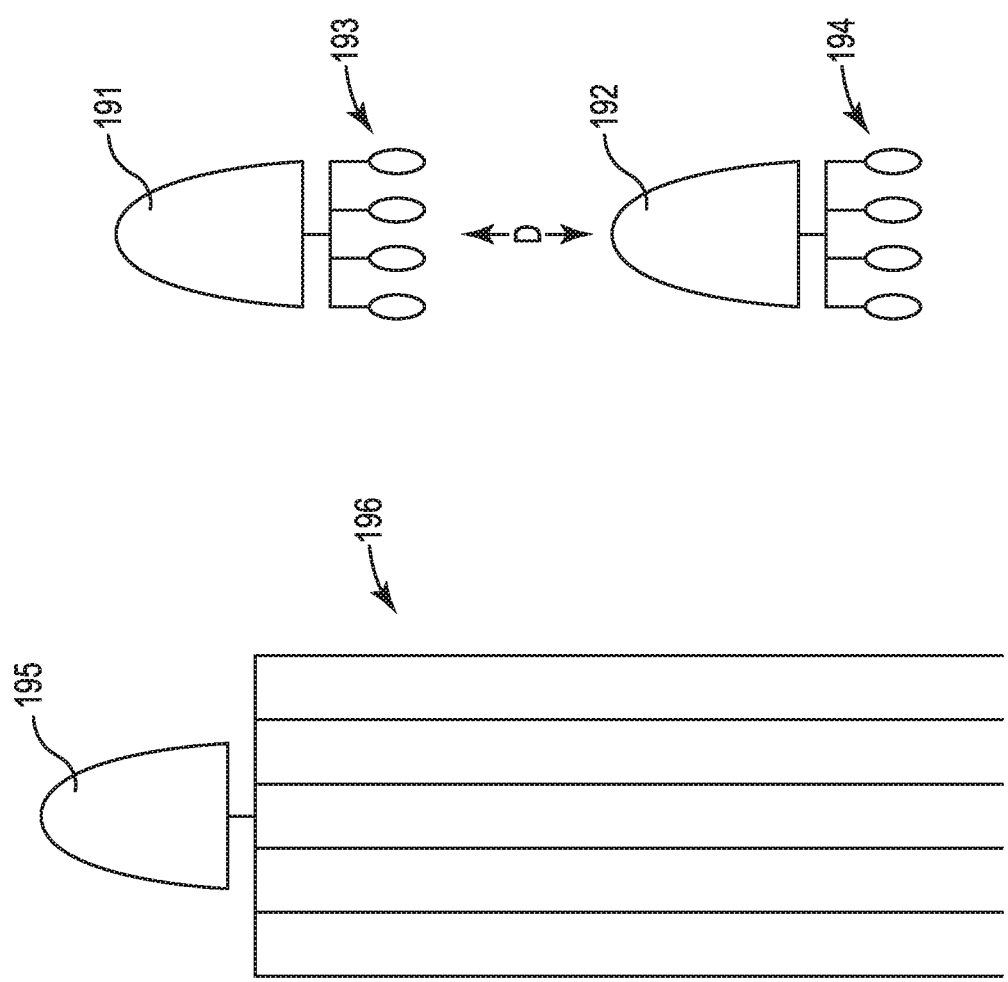

SEISMIC DATA ACQUISITION WITH VARYING DISTANCE BETWEEN SEISMIC VESSELS

CROSS-REFERENCE TO RELATED APPLICATIONS

This application is a continuation of U.S. patent application Ser. No. 14/564,363, filed Dec. 9, 2014, issuing Aug. 1, 2017 as U.S. Pat. No. 9,720,120, SEISMIC DATA ACQUISITION WITH VARYING RELATIVE DISTANCE BETWEEN MULTIPLE SEISMIC VESSELS, and claims priority to U.S. Provisional Application No. 61/914,836, SEISMIC DATA ACQUISITION WITH VARYING RELATIVE DISTANCE BETWEEN MULTIPLE SEISMIC VESSELS, filed Dec. 11, 2013, each of which is hereby incorporated by reference herein, in the entirety and for all purposes.

BACKGROUND

The present invention generally relates to marine seismic prospecting, and in particular to seismic prospecting methods using multiple vessels.

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers in order to create an image of the subsurface of the Earth.

Each receiver may include, for example, a pressure sensor and/or a particle motion sensor in proximity to one another. The pressure sensor may be, for example, a hydrophone that records scalar pressure measurements of a seismic wavefield. The particle motion sensor may be, for example, a three-component geophone that records vectorial velocity measurements of the seismic wavefield. By observing the reflected seismic wavefield detected by the receiver(s) during the survey, the geophysical data pertaining to reflected signals may be acquired and these signals may be used to form an image indicating the composition of the Earth near the survey location.

Marine seismic surveys generally involve towing one or more streamer cables comprising a plurality of receivers with a seismic vessel. The number of receivers placed in the streamer and the relative distance between the receivers generally determines the quality of seismic data that is recorded. Improving seismic data collection has traditionally involved increasing the length of streamer cables and the density of receivers included therein. However, the longer the streamer cables, the more difficult it becomes to keep streamer cables separated and in a desired configuration, for example, when turning the seismic vessel or maneuvering the seismic vessel in icy or obstructed waters.

SUMMARY

The present invention generally relates to marine seismic prospecting, and in particular to seismic prospecting using multiple vessels. During acquisition of seismic data, a distance between a first seismic vessel and a second seismic vessel may be adjusted according to a predefined function such that data is collected at a variety of offsets and/or azimuths.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

FIGS. 1A-1C illustrate an exemplary seismic survey according to an embodiment of the invention.

DETAILED DESCRIPTION

Figure 1A:
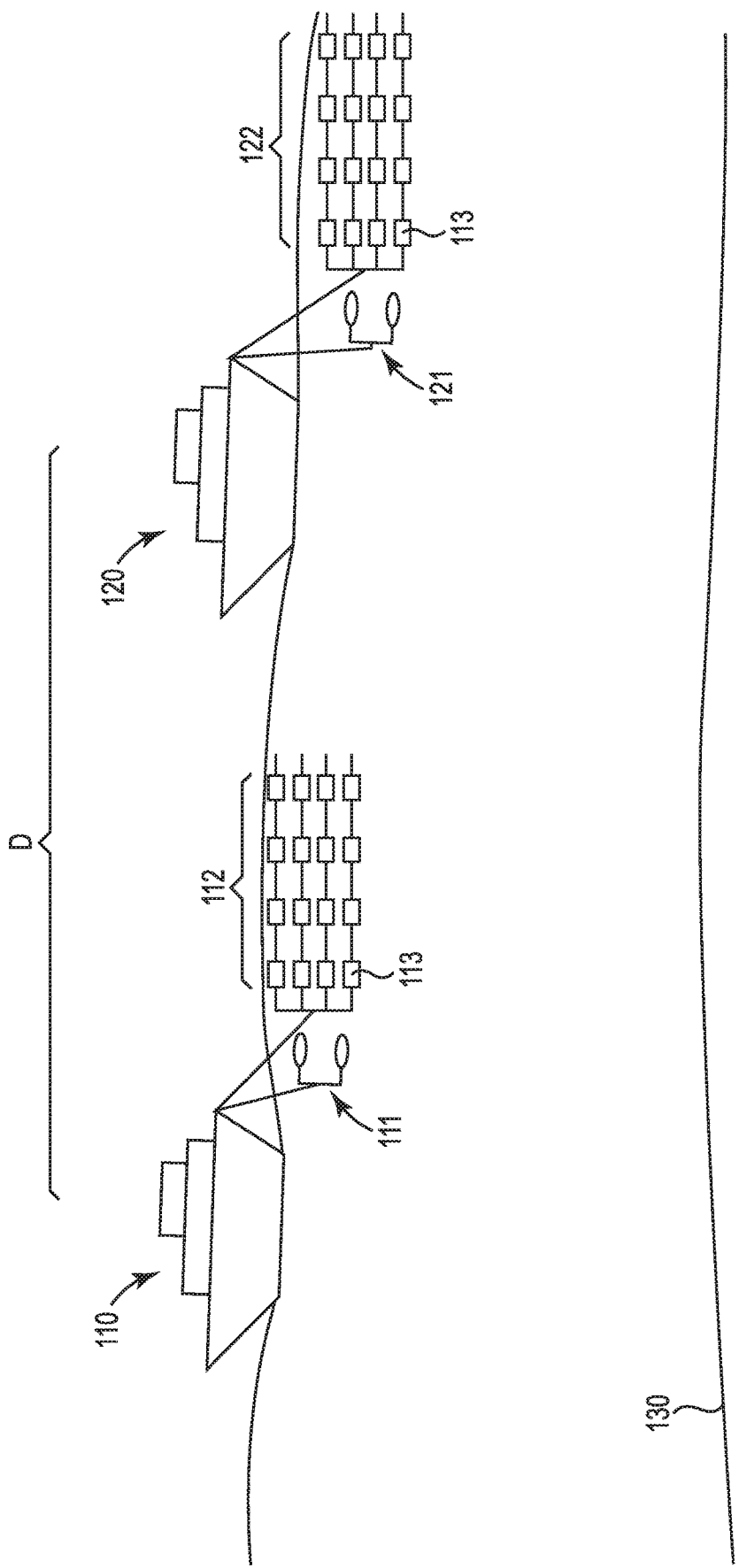

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1A illustrates an exemplary seismic survey according to an embodiment of the invention. As illustrated in FIG. 1A, a first seismic vessel 110 and a second seismic vessel 120 may collaboratively perform a seismic survey. In one embodiment, the first seismic vessel 110 may be configured to tow one or more seismic sources 111 and one or more streamer cables 112. The second seismic vessel 120 may also be configured to tow one or more seismic sources 121 and/or one or more streamer cables 122, as shown in the embodiment illustrated in FIG. 1A.

While FIG. 1A shows the first vessel 110 and the second vessel 120 each towing respective sources and streamer cables, in alternative embodiments, the sources and streamers may be arranged differently between the first and second vessels. For example, in one embodiment, one of the first vessel 110 and the second seismic vessel 120 may tow one or more sources and one or more streamer cables, while the other one of the first seismic vessel 110 and second vessel 120 may only tow one or more streamer cables. In another embodiment, one of the first seismic vessel 110 and second seismic vessel 120 may tow one or more sources and one or more streamer cables, while the other one of the first seismic vessel 110 and second seismic vessel 120 may only tow one or more sources. In yet another embodiment, one of the first seismic vessel 110 and second seismic vessel 120 may only tow one or more sources, while the other one of the first seismic vessel 110 and second seismic vessel 120 may only tow one or more streamer cables.

In one embodiment, the first seismic vessel 110 and the second seismic vessel 120 may be configured to only tow one or more sources each. In such an embodiment, an additional seismic vessel may also be included in the survey to tow one or more streamer vessels near the first and second seismic vessel. In another embodiment, the first seismic vessel 110 and the second seismic vessel may be configured to only tow one or more streamers. In such an embodiment an additional seismic vessel may be included in the survey to tow one or more sources near the first seismic vessel and second seismic vessel.

Referring back to FIG. 1A, the seismic sources 111 and 121 may each be an air gun array configured to release a blast of compressed air into the water column towards the seabed 130. A blast of compressed air from the air guns 111 and/or 121 generates seismic waves which may travel down towards the seabed 130, and penetrate and/or reflect from sub-seabed surfaces. The reflections from the sub-surfaces may be recorded by seismic sensors 113 as seismic data. Exemplary seismic sensors include any one or a combination of hydrophones, geophones, particle motion sensors such as accelerometers, and the like. The seismic data acquired via the seismic sensors 113 may be processed to develop an image of the sub-surface layers. These images may be analyzed by geologists to identify areas likely to include hydrocarbons or other substances of interest.

In one embodiment of the invention the seismic sources 111 and 121 may be configured to operate simultaneously or substantially simultaneously. Simultaneous source operation generally involves firing two sources in an overlapping manner with a predefined time delay. Interference between sources can also be created by firing sources simultaneously at predefined spaced apart locations between the sources. Multiple sources that are fired simultaneously (or nearly simultaneously) from different locations may provide better coverage, e.g., in obstructed areas, and may provide greater azimuthal diversity for the survey.

In one embodiment of the invention, the size of the seismic receiver arrays (formed by the cables 112 and 122) towed by the seismic vessels may be the same. However, in alternative embodiments, each vessel may tow a different sized array. Examples of factors determining array size include one or more of the number of cables, relative spacing between cables, the length of the cables, and the like.

FIG. 1A further illustrates a distance D that is maintained between the first vessel 110 and the second vessel 120 during seismic data acquisition. In one embodiment of the invention, the distance D may be determined by a predefined variable function. The predefined function may be configured to adjust a parameter, for example, speed, velocity, acceleration, or the like of two or more seismic vessels such that the distance between the seismic vessels is varied in a desirable manner. The predefined function is sometimes referred to herein as a "distance function" or "predefined distance function".

For example, in one embodiment, the distance between the first vessel 110 and the second vessel 120 may be reduced from a first distance to a second distance during a first time period. Thereafter, the distance between the first vessel 110 and the second vessel 120 may be increased from the second distance to the first distance in a second period of time. The distance between the first vessel and the second vessel may be continuously varied by repeatedly moving the first vessel 110 and the second vessel 120 closer and then further away, in one embodiment.

The distance D may be determined based on any two predefined points on, for example, the seismic vessels 110 and 120, the seismic cables or arrays 112 and 122, sources 111 and 121, or the like. In a particular embodiment, the distances may be determined based on any reasonable predefined points on the first vessel 110 and second vessel 120, e.g., the bow, stern, center of the vessel, etc. In one embodiment, GPS devices may be provided at one or more locations associated with the seismic vessels or items being towed by the seismic vessels. The distance between may therefore be determined based on the relative distance between the GPS devices.

Figure 1B:
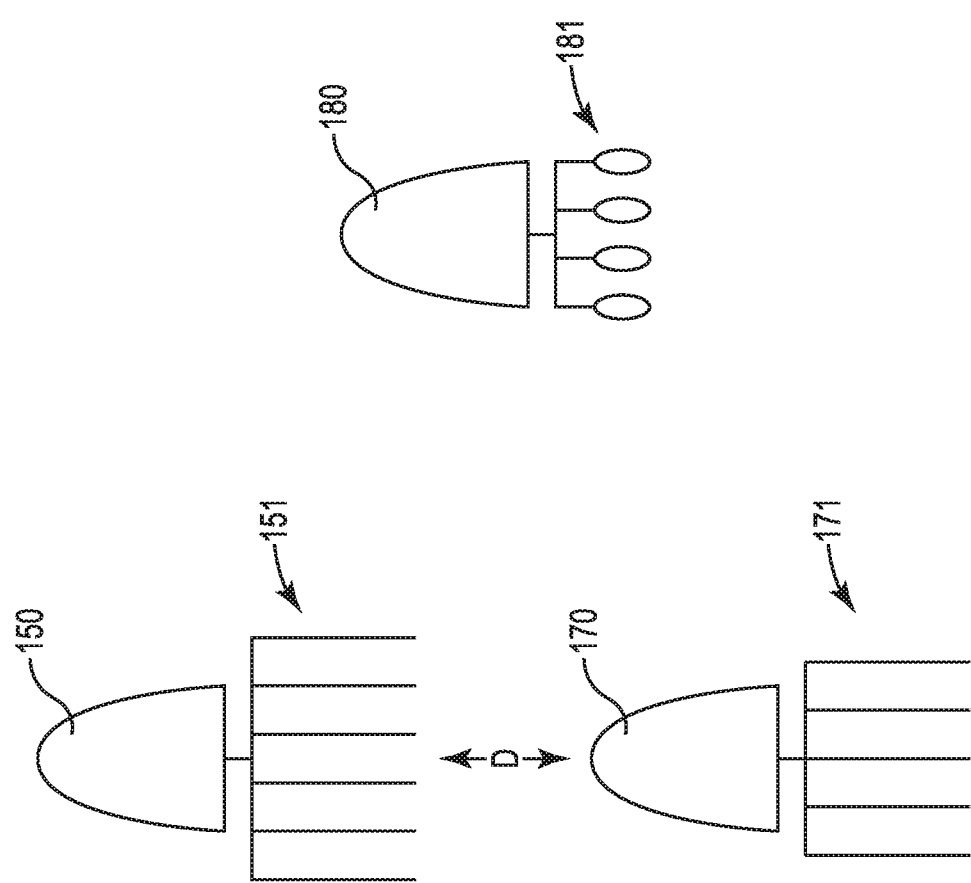

FIG. 1B illustrates a seismic survey according to another embodiment of the invention. As shown in FIG. 1B, a first seismic vessel 150 and a second seismic vessel 170 may tow respective seismic sensor arrays 151 and 171. A third seismic source vessel 180 may tow a seismic source array 181. During acquisition, the vessels 150 and 170 may vary a distance between them based on a predefined distance function D. In one embodiment, the source vessel 180 may travel at a substantially constant velocity associated with the average velocities of the vessels 150 and 170 and provide the source impulses for recording seismic data in the sensor arrays 151 and 171. In an alternative embodiment, the source vessel 180 may vary its respective velocity while maintaining an average velocity associated with the average velocities of the vessels 150 and 170.

FIG. 1C illustrates a seismic survey according to another embodiment of the invention. As shown in FIG. 1C, a first source vessel 191 and a second source vessel 192 may tow respective seismic source arrays 193 and 194. A third seismic streamer vessel 195 may tow a seismic sensor array 196. During acquisition, the vessels 191 and 192 may vary a distance between them based on a predefined distance function D. In one embodiment, the seismic streamer vessel 195 may travel at a substantially constant velocity associated with the average velocities of the vessels 191 and 192. In an alternative embodiment, the seismic streamer vessel 195 may vary its respective velocity while maintaining an average velocity associated with the average velocities of the vessels 191 and 192.

Figure 2A:
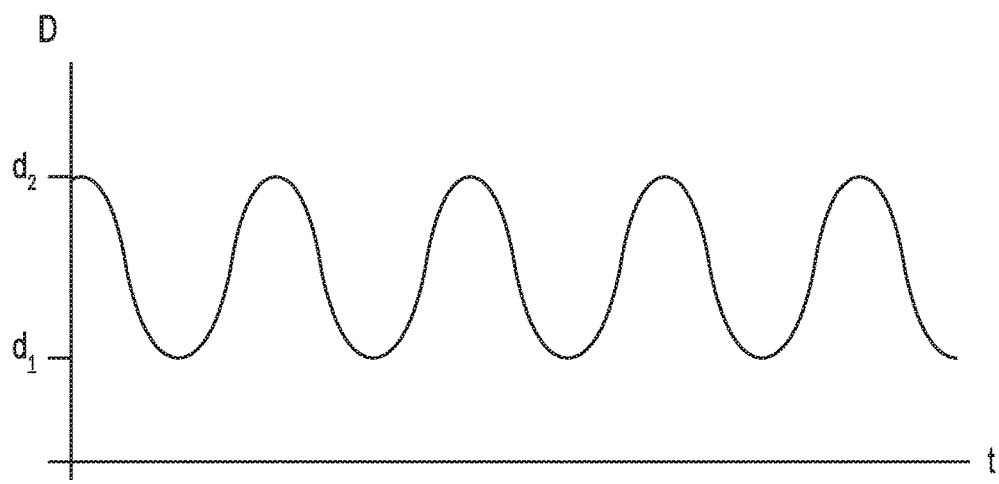
FIGS. 2A-2C illustrate exemplary distance functions according to embodiments of the invention.
Figure 2B:
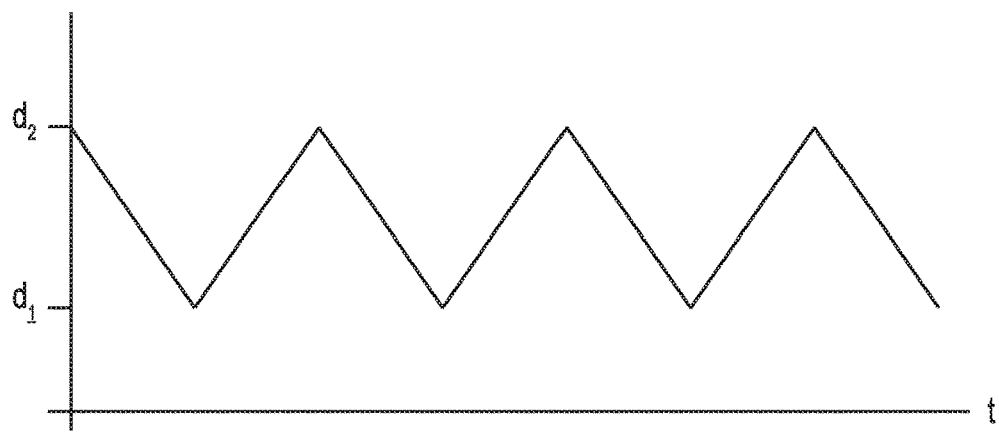

FIGS. 2A and 2B illustrate exemplary functions to vary the distance between seismic vessels, according to an embodiment of the invention. FIG. 2A illustrates sinusoidal variation of the distance D between the first vessel 110 and the second vessel 120 from a distance d1 to a distance d2. The distances d1 and d2 may be any preselected distances. For example, in one embodiment, the distance d1 may be at or near 0 (zero) or as close as operationally possible for one seismic vessel to be near the other. FIG. 2B illustrates an alternative distance function, wherein the distance D between the first vessel 110 and second vessel 120 is varied in a linear fashion. Any reasonable slope of inclination and declination may be used, and moreover, the slope of inclination need not have the same magnitude as the slope of declination.

Figure 2C:
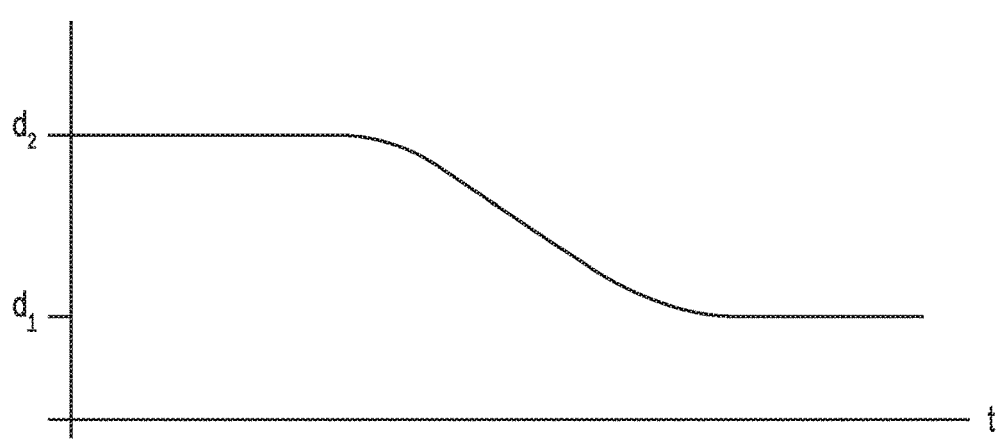

While FIGS. 2A and 2B illustrate continuous and periodic distance functions, embodiments of the invention are not limited to such functions. In general, the distance function may be any type of function, whether periodic or aperiodic. FIG. 2C illustrates an exemplary distance function that is not periodic. The function may be used for establishing distance between a first seismic vessel 110 and a second seismic vessel 120, for example, while acquiring seismic data on a predetermined navigation line.

Figure 3:
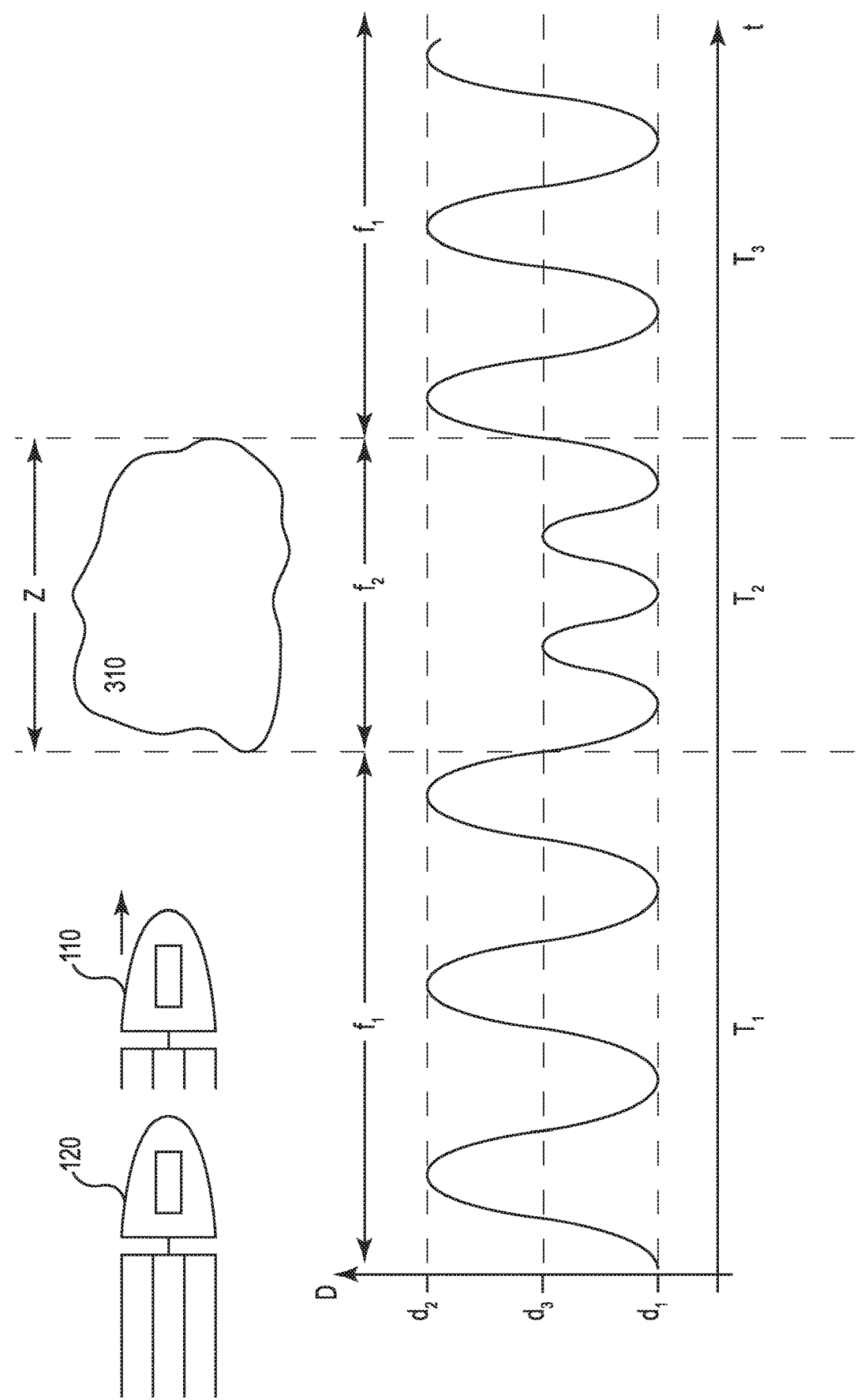
FIG. 3 illustrates dynamically adjusting distance functions according to an embodiment of the invention.

In one embodiment of the invention, different distance functions may be defined for different types of areas of interest while conducting the seismic survey. For example, FIG. 3 illustrates the seismic vessels 110 and 120 approaching an area of interest 310. FIG. 3 also illustrates corresponding distance functions that may be implemented by the vessels 110 and 120 while conducting the survey. For example, in a first time period T1 when the seismic vessels are outside a zone Z associated with the area of interest 310, the seismic vessels may operate based on a first distance function f1. Upon entering the zone Z, the seismic vessels 110 and 120 may begin operating according to a second distance function f2. Thereafter, upon exiting the zone Z, the seismic vessels 110 and 120 may return to operating according to the distance function f1.

Any number of different functions may be defined for any number of different types of areas of interest. In general the different distance functions may be defined so that a desired density of sensors is achieved for shot gathers in different types of areas of interest. For example, in FIG. 3, the area of interest 310 may have a high probability of containing hydrocarbons, and therefore a greater density may be desired for the shot gather to develop a more detailed and more reliable image of the sub surface. Accordingly, as shown in FIG. 3, the seismic vessels 110 and 120 may be operated relatively closer to one another to improve density of the shot gathers.

Figure 4A:
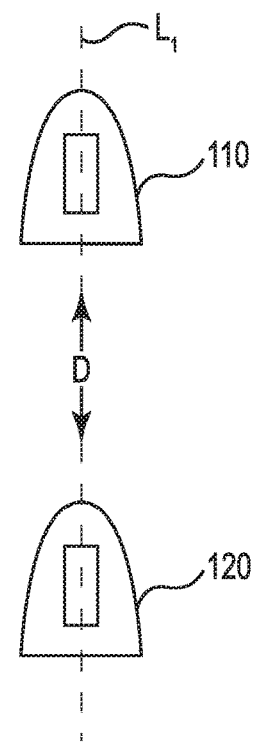
FIGS. 4A-4C illustrate an exemplary seismic survey according to an embodiment of the invention.
Figure 4B:
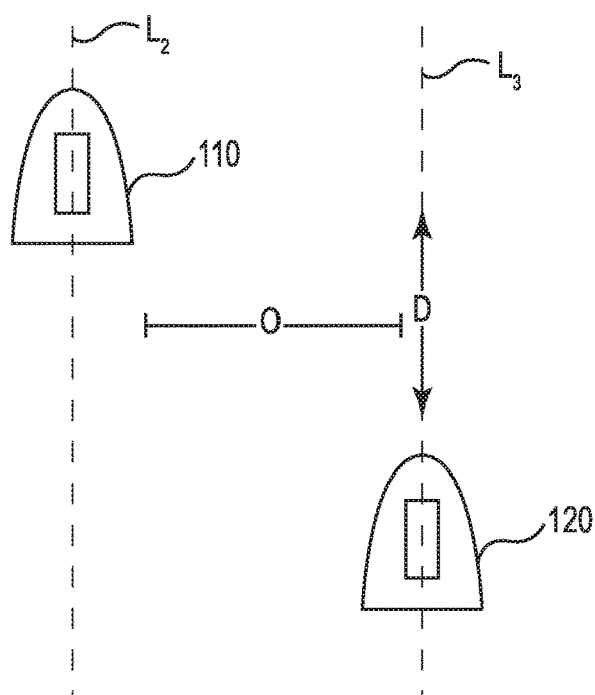

FIGS. 4A and 4B illustrate exemplary relative positioning of the seismic vessels 110 and 120. In one embodiment, the seismic vessels 110 and 120 may be configured to move along the same navigation line L1, as illustrated in FIG. 4A. Therefore, the distance function D may cause the first vessel 110 and second vessel 120 to move closer together and/or further away along that same line L1. In an alternative embodiment, the first seismic vessel 110 may be configured to travel on a first line L2, and the second seismic vessel 120 may be configured to travel on a second line L3 that is offset from the first line L2, as illustrated in FIG. 4B. The offset O may be any reasonable distance. In one embodiment, the offset may be determined by a number of seismic streamer cables towed by the first seismic vessel and/or the second seismic vessel, the relative distance between the streamer cables, and the like.

In one embodiment, varying the distance between the first seismic vessel 110 and the second seismic vessel 120 may involve varying the distance O illustrated in FIG. 4B, thereby facilitating seismic data acquisition at a variety of azimuths. Any type of distance function, e.g., the distance functions illustrated in FIGS. 2A-2C may be used to vary the offset O. While varying the distance along the offset O direction and the in-line direction are disclosed herein, in alternative embodiments, the distance between the seismic vessels may be varied in any direction, e.g., the diagonal distance between the seismic vessels in FIG. 4B. In some embodiments, the distance between the seismic vessels may be varied along two or more directions. For example, the distance between the seismic vessels may be varied along an in-line direction as well as an offset direction.

Figure 4C:
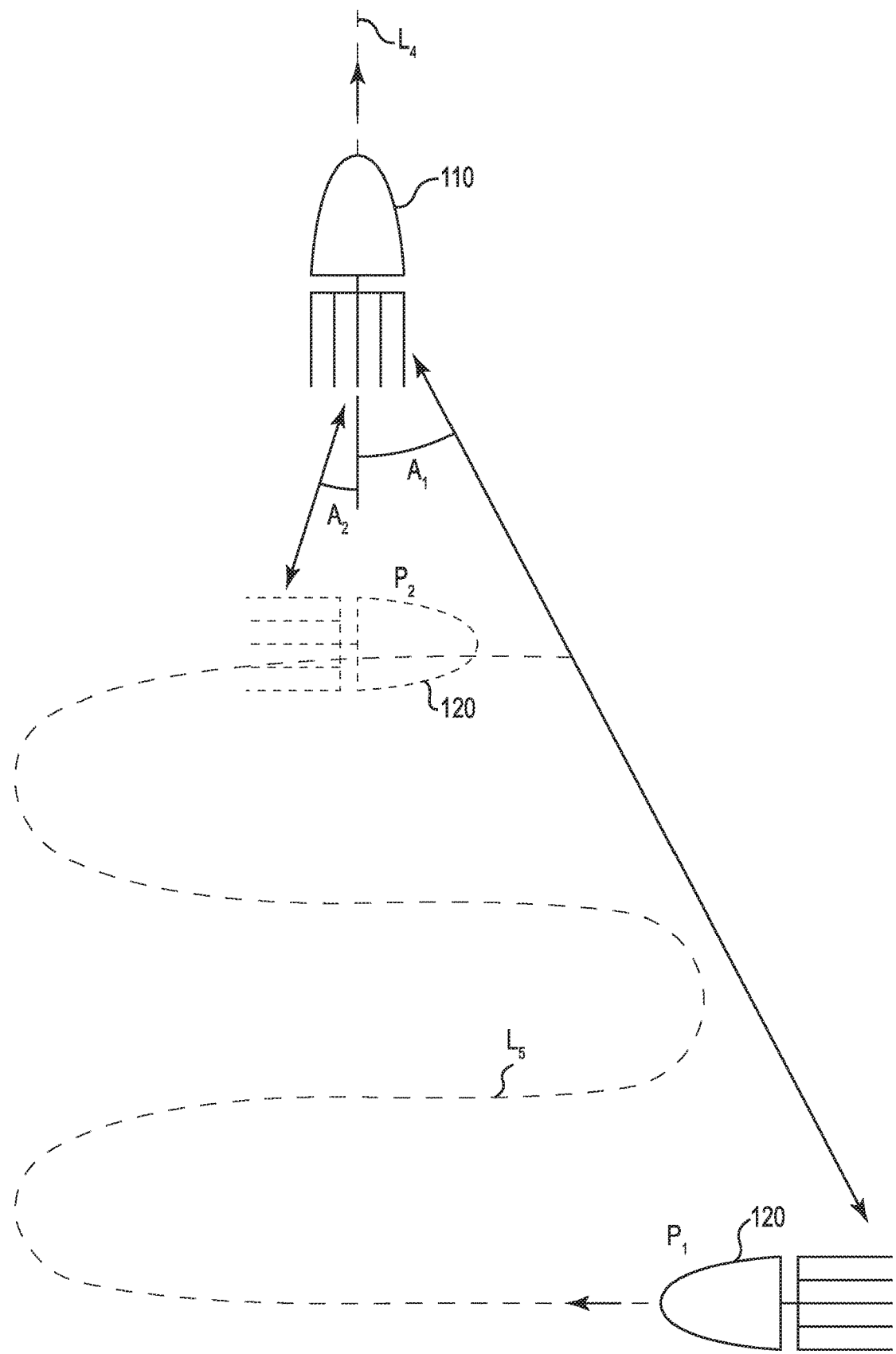

FIG. 4C illustrates yet another method for conducting a seismic survey according to an embodiment of the invention. As illustrated, a first seismic vessel 110 may travel along a substantially straight navigation line L4. A second seismic vessel 120 may travel with the first seismic vessel 110 along a meandering path L5, as shown in FIG. 4C. The velocities of the vessels 110 and 120 may be selected and/or adjusted such that the distance between the vessels 110 and 120 is varied according to a predefined distance function. Furthermore, because the second seismic vessel 120 travels on a meandering path, seismic data is collected along a variety of azimuths. For example, when the second seismic vessel 120 is at a first position P1 seismic data may be collected at a first azimuth angle A1, whereas at a second position P2, seismic data may be collected at a second azimuth angle A2. While FIG. 4C illustrates a first seismic vessel 110 travelling along a straight navigation line and a second seismic vessel 120 travelling along a meandering path, in alternative embodiments, both seismic vessels 110 and 120 may follow meandering paths.

Implementing the distance function D may be accomplished in a plurality of ways. For example, in one embodiment, one of the seismic vessels 110 and 120 may maintain a constant velocity while the other one of the seismic vessels 110 and 120 may vary its respective velocity to achieve the distance function. Alternatively, both of the seismic vessels may coordinate adjustment of their respective velocities to achieve the distance function. In embodiments where two or more seismic vessels vary their respective velocities, each seismic vessel may vary its velocity while maintaining a predefined average velocity, according to one embodiment. In one embodiment, the average velocity of each of the vessels may be substantially equal, but in other embodiments, different average velocities may be defined for each vessel.

While embodiments of the invention are described with reference to two seismic vessels 110 and 120, in alternative embodiments, any number of seismic vessels may be utilized while conducting a survey. Furthermore, when more than two seismic vessels are utilized, distance functions may be defined for any one or more pairs of seismic vessels.

Figure 5A:
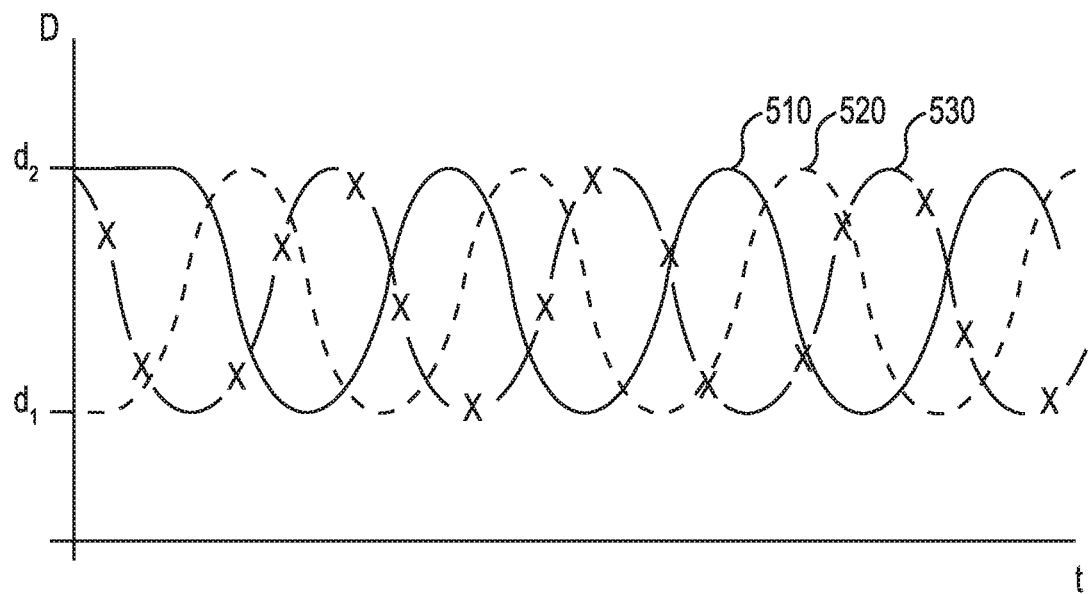
FIG. 5A illustrates adjusted distance functions during multiple passes over a navigation line, according to an embodiment of the invention.

In one embodiment of the invention, a plurality of seismic vessels may repeat acquisition over a particular sail line two or more times. During each repetition, the distance function may be shifted such that acquisition occurs at a variety of different receiver positions. FIG. 5A illustrates three different shifted distance functions that may be implemented over a particular sail/navigation line, according to an embodiment of the invention. A first distance function 510 may be implemented during a first pass over a particular sail line, a second distance function 520 may be implemented during a second pass over the same sail line, and a third distance function 530 may be implemented during a third pass over the same sail line.

Figure 5B:
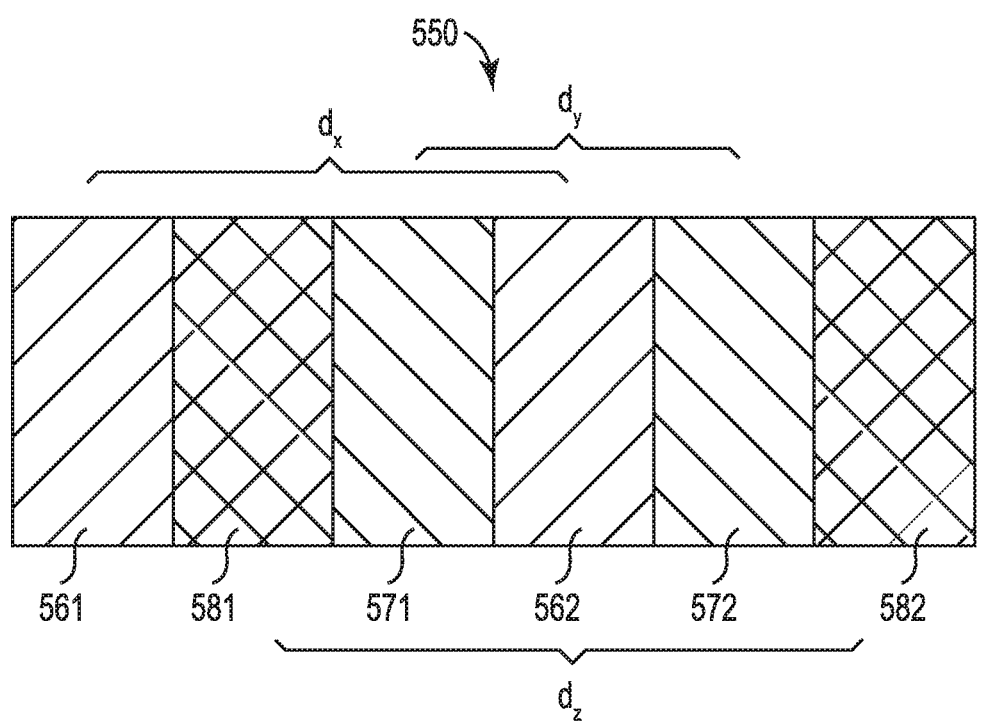
FIG. 5B illustrates exemplary seismic receiver coverage over an area of interest during multiple passes over a navigation line, according to an embodiment of the invention.

FIG. 5B illustrates exemplary positions of seismic receiver arrays in an area of interest 550 during a two vessel operation according to an embodiment of the invention. For example, the area 561 may represent the position of a first seismic receiver array associated with a first seismic vessel during a first pass over a given sail line while implementing a first distance function, e.g., the distance function 510 of FIG. 5A. The area 562 may represent the position of a second seismic receiver array associated with a second seismic vessel during the first pass over the sail line while implementing the first distance function. As shown in FIG. 5B, the distance between the first and second seismic receiver arrays during the first pass may be dx.

During a second pass over the same sail line, a different distance function, e.g., the distance function 520 of FIG. 5A may be implemented. As a result, the distance between the first seismic receiver array and the second seismic receiver array may be dy while in the area 550, therefore positioning the respective arrays in areas 571 and 572. During a third pass over the same sail line the seismic receiver arrays may implement a different distance function, e.g. function 530 of FIG. 5A, which may position the arrays in areas 581 and 582. If seismic data is recorded when the receiver arrays are in the areas 561, 562, 571, 572, 581, and 582 during the three passes, then seismic data may be gathered for the entire area 550.

Therefore, embodiments of the invention obviate the necessity of excessively large and long seismic arrays which can be difficult to maneuver and manage by providing a method for varying relative positions between multiple seismic arrays during consecutive passes over a sail line, thereby providing a requisite coverage of receiver positions for seismic data acquisition over a given area of interest.

Figure 6:
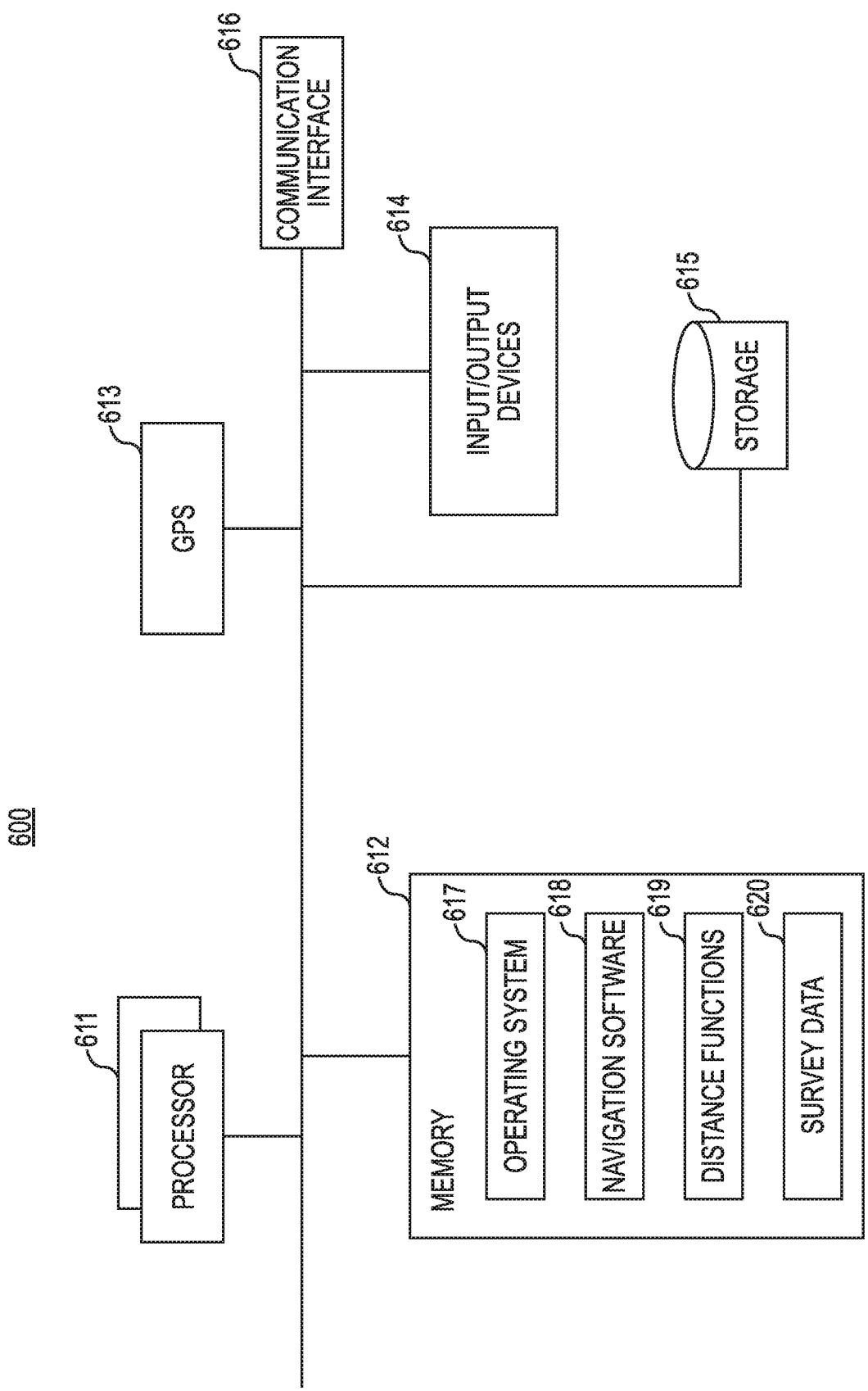
FIG. 6 illustrates an exemplary control system according to an embodiment of the invention.

FIG. 6 illustrates an exemplary control system 600 according to an embodiment of the invention. The control system may be configured to implement a distance function between two seismic vessels as described hereinabove. As illustrated in FIG. 6, the control system 600 may include one or more processors 611, a memory 612, a global positioning satellite (GPS) device 613, input/output devices 614, storage 615, and a communications interface 616.

The input/output devices 614 may include input devices such as a mouse, keyboard, touchscreens, and the like, and output devices such as CRT monitors, LCD displays, tablet computers, and the like. Storage device 615 stores application programs and data for use by the control system 600. Typical storage devices include hard-disk drives, flash memory devices, optical media, network and virtual storage devices, and the like. The communications interface 616 may connect the control system 600 to any kind of data communications network, including either wired networks, wireless networks, or a combination thereof.

The memory 612 is preferably a random access memory sufficiently large to hold the necessary programming and data structures of the invention. While memory 612 is shown as a single entity, it should be understood that memory 612 may in fact comprise a plurality of modules, and that memory 612 may exist at multiple levels, from high speed registers and caches to lower speed but larger DRAM chips.

Illustratively, the memory 612 contains an operating system 617. Well known examples of operating systems include the Windows® operating system, distributions of the Linux® operating system, and IBM's AIX and OS/2® operating systems, among others. More generally, any operating system supporting the functions disclosed herein may be used.

Memory 612 is also shown containing a navigation program 618 which, when executed by the processor 611, provides support for implementing a distance function during a seismic survey. For example, in one embodiment, the navigation software may determine a position of one or more seismic vessels conducting a survey (via e.g., GPS data from the GPS device 613) and based on the determined position, adjust a speed of one or more of the seismic vessels to achieve a desired distance function.

Memory 612 may also contain distance functions 619 and survey data 620. The distance functions may define one or more distinct distance functions that may be used during a seismic survey, for example, the distance functions illustrated in FIG. 3. Survey data 620 may include data regarding, for example, specific areas of interest. In one embodiment, the navigation software may use GPS data from the GPS device 613 to determine whether one or more survey vessels are approaching an area of interest (e.g., the area 310 shown in FIG. 3), and in response to determining that the one or more vessels are approaching an area of interest, adjust the distance function that is used, as described hereinabove.

In one embodiment of the invention, the control system 600 may be implemented in computer systems included in one or more seismic vessels conducting the survey. For example, navigation software systems operating in each vessel may communicate with each other via the communications interface 616 to adjust the distance between one or more vessels, thereby achieving a desired distance function. The navigation software operating in multiple vessels may use any reasonable model of communication, for example, a master-slave configuration wherein navigation software in one primary vessel controls the navigation software in other vessels.

In another embodiment, the control system 600 may not be located on the seismic vessels. For example, the seismic vessels may be configured to communicate with a central computer system which may be located, for example, on land, and receive instructions from the central computer system to adjust speeds to achieve a desired distance function.

Figure 7:
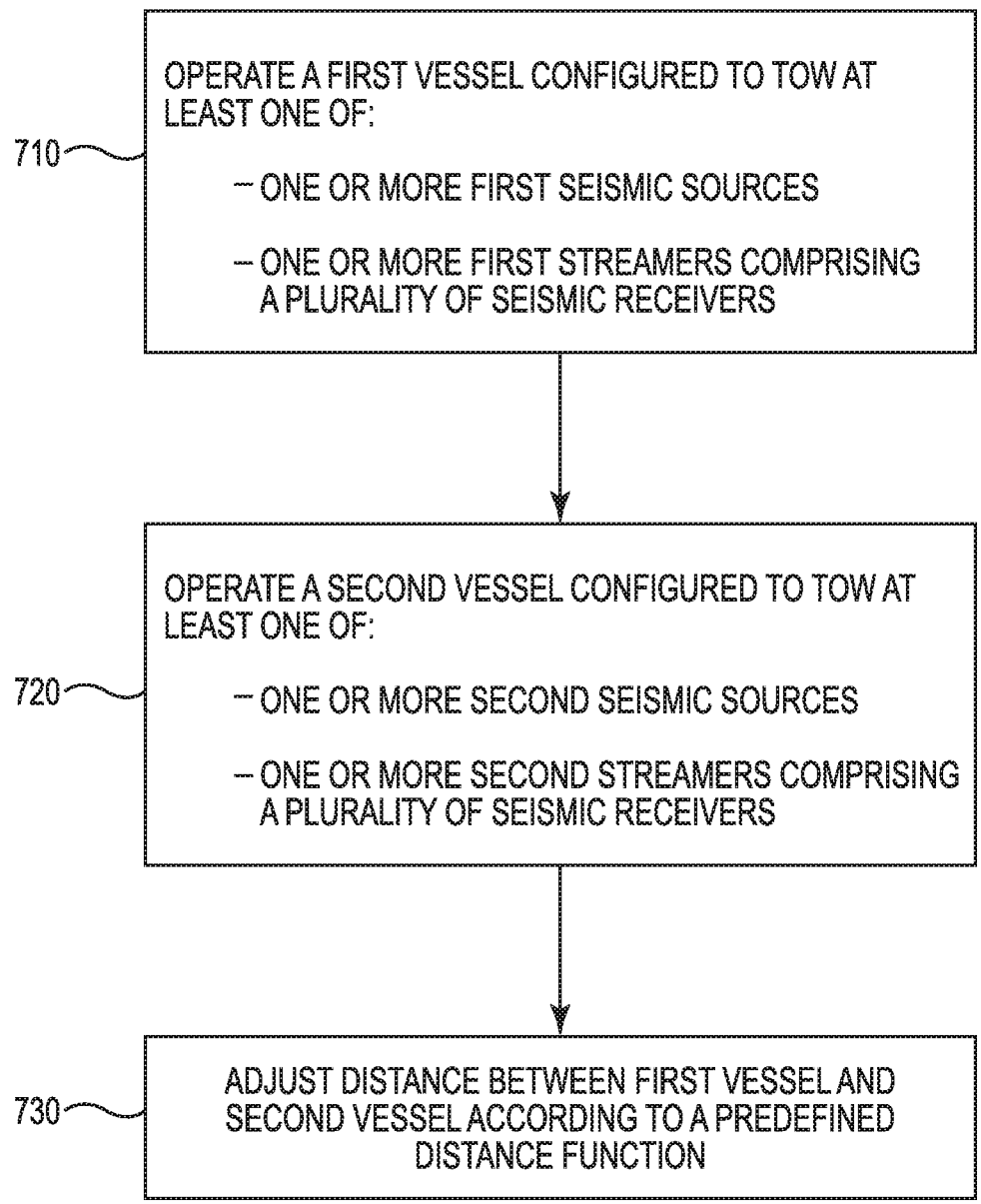
FIG. 7 is a flow diagram of exemplary operations performed during a seismic survey, according to an embodiment of the invention.

FIG. 7 is a flow diagram of exemplary operations that may be performed during a seismic survey, according to an embodiment of the invention. The operations generally comprise operating a first seismic vessel configured to tow at least one of one or more first seismic sources and one or more first streamers comprising a plurality of seismic receivers, as illustrated in step 710. The operations further comprise operating a second seismic vessel configured to tow at least one of one or more second seismic sources and one or more second streamers comprising a plurality of seismic receivers, as illustrated in step 720. In step 730, a distance between the first seismic vessel and the second seismic vessel may be adjusted according to a predefined distance function during seismic data acquisition.

While the foregoing is directed to embodiments of the present invention, other and further embodiments of the invention may be devised without departing from the basic scope thereof, and the scope thereof is determined by the claims that follow.

The invention claimed is:

1. A method for acquiring seismic data, comprising:
operating a first seismic vessel towing at least one seismic streamer comprising a plurality of seismic sensors; and
operating a second seismic vessel towing at least one seismic source;
wherein the first seismic vessel follows a first seismic acquisition line and the second seismic vessel follows a second seismic acquisition line that is offset from the first seismic acquisition line; and
during acquisition of the seismic data, adjusting a speed of the first seismic vessel to achieve a desired in-line distance between the first seismic vessel and the second seismic vessel according to a first predefined distance function;
wherein the first seismic vessel is configured to travel at a variable velocity following the first seismic acquisition line to adjust the in-line distance from the second seismic vessel following the second seismic acquisition line that is offset from the first seismic acquisition line; and
wherein the in-line distance is reduced from a first distance to a second distance during a first time period and increased from the second distance to the first distance in a second time period.

2. The method of claim 1, wherein the first seismic vessel and the second seismic vessel travel along substantially straight seismic acquisition lines.

3. The method of claim 1, wherein adjusting the in-line distance between the first seismic vessel and the second seismic vessel comprises adjusting a speed of one or more of the seismic vessels to achieve a desired distance function by cyclically:
reducing the in-line distance between the first seismic vessel and the second seismic vessel; and
increasing the in-line distance between the first seismic vessel and the second seismic vessel.

4. The method of claim 1, wherein adjusting the in-line distance between the first seismic vessel and the second seismic vessel comprises:
operating the first seismic vessel at a constant first velocity following the first seismic acquisition line; and
operating the second seismic vessel at a variable second velocity following the second seismic acquisition line.

5. The method of claim 1, wherein:
the first seismic vessel and the second seismic vessel each tows a seismic source; and
the seismic sources towed by the first and second seismic vessels are configured to fire substantially simultaneously.

6. The method of claim 1, wherein the first and second seismic acquisition lines are parallel.

7. The method of claim 1, wherein an offset between the first seismic acquisition line and the second seismic acquisition line is determined by a number of said at least one seismic streamer towed by the first seismic vessel.

8. A method for acquiring seismic data, comprising:
operating a first seismic vessel towing at least one seismic streamer comprising a plurality of seismic sensors; and
operating a second seismic vessel towing at least one seismic source;
wherein the first seismic vessel follows a first seismic acquisition line and the second seismic vessel follows a second seismic acquisition line that is offset from the first seismic acquisition line; and
during acquisition of the seismic data, adjusting an in-line distance between the first seismic vessel and the second seismic vessel according to a first predefined function;
repeating the acquisition of the seismic data along a previously travelled seismic acquisition line by the first seismic vessel and the second seismic vessel; and
during the repeated acquisition, adjusting the in-line distance between the first seismic vessel and the second seismic vessel according to a second predefined function.

9. A non-transitory computer readable storage medium carrying a program product comprising computer-readable instructions which, when executed on a computer processor, are configured to perform a method comprising:
operating a first seismic vessel towing at least one seismic streamer comprising a plurality of seismic sensors; and
operating a second seismic vessel towing at least one seismic source;
wherein the first seismic vessel follows a first seismic acquisition line and the second seismic vessel follows a second seismic acquisition line offset from the first seismic acquisition line; and
during acquisition of seismic data, adjusting a speed of the first seismic vessel to achieve a desired in-line distance between the first seismic vessel and the second seismic vessel according to a first predefined distance function;
wherein the first seismic vessel is configured to travel at a variable velocity following the first seismic acquisition line to adjust the in-line distance from the second seismic vessel following the second seismic acquisition line that is offset from the first seismic acquisition line; and
wherein the in-line distance is reduced from a first distance to a second distance during a first time period and increased from the second distance to the first distance in a second time period.

10. The computer readable storage medium of claim 9, wherein the first seismic vessel and the second seismic vessel travel along substantially straight seismic acquisition lines.

11. The computer readable storage medium claim 9, the method further comprising:

repeating the acquisition of the seismic data along a previously travelled seismic acquisition line by the first seismic vessel and the second seismic vessel; and during the repeated acquisition, adjusting the in-line distance between the first seismic vessel and the second seismic vessel according to a second predefined function.

12. The computer readable storage medium of claim 9, wherein adjusting the in-line distance between the first seismic vessel and the second seismic vessel comprises adjusting a speed of one or more of the seismic vessels to achieve a desired distance function by cyclically:

reducing the in-line distance between the first seismic vessel and the second seismic vessel; and increasing the in-line distance between the first seismic vessel and the second seismic vessel.

13. The computer readable storage medium of claim 9, wherein adjusting the in-line distance between the first seismic vessel and the second seismic vessel comprises:

operating the first seismic vessel at a constant first velocity following the first acquisition line; and operating the second seismic vessel at a variable second velocity following the second seismic acquisition line.

14. The computer readable storage medium of claim 9, wherein:

the first seismic vessel and the second seismic vessel each tows a seismic source; and the seismic sources towed by the first and second seismic vessels are configured to fire substantially simultaneously.

15. The computer readable storage medium claim 9, wherein the first and second seismic acquisition lines are parallel.

16. The computer readable storage medium claim 9, wherein an offset between the first seismic acquisition line and the second seismic acquisition line is determined by a number of said at least one seismic streamer towed by the first seismic vessel.

17. A seismic vessel configured to:

tow at least one of one or more seismic streamers and a seismic source; and during acquisition of seismic data, adjust a speed of the seismic vessel to achieve a desired in-line distance from another seismic vessel according to a distance function;

wherein the seismic vessel is configured to travel at a variable velocity following a first seismic acquisition line to adjust the in-line distance from the other seismic vessel following a second seismic acquisition line that is offset from the first seismic acquisition line; and wherein the in-line distance is reduced from a first distance to a second distance during a first time period and increased from the second distance to the first distance in a second time period.

18. The seismic vessel of claim 17, further configured to:

determine a position of the seismic vessel; and based on the determined position, adjust a speed the seismic vessel to achieve the distance function.

19. The seismic vessel of claim 17, further configured to:

determine whether the seismic vessel is approaching an area of interest; and in response to determining that the seismic vessel is approaching an area of interest, adjust the distance function.

20. The seismic vessel of claim 17, wherein the first and second seismic acquisition lines are parallel.

* * * * *